(12) United States Patent  (10) Patent No.: US 8,375,077 B2
Laurent  (45) Date of Patent: Feb. 12, 2013

(54) METHOD, APPARATUS AND MEDIA FOR PERFORMING GF(2) POLYNOMIAL OPERATIONS

(75) Inventor: Pierre Laurent, Quin (IE)

(73) Assignee: Intel Corporation, Santa Clara, CA (US)

( * ) Notice: Subject to any disclaimer, the term of this patent is extended or adjusted under 35 U.S.C. 154(b) by 1171 days.

(21) Appl. No.: 12/239,927

(22) Filed: Sep. 29, 2008

(65) Prior Publication Data

US 2010/0082723 A1    Apr. 1, 2010

(51) Int. Cl.
*G06F 7/00* (2006.01)
(52) U.S. Cl. ...................................................... 708/492
(58) Field of Classification Search ................... 708/492
See application file for complete search history.

(56) References Cited

U.S. PATENT DOCUMENTS

| 5,890,800 | A | | 4/1999 | Meyer |
| 5,999,959 | A | * | 12/1999 | Weng et al. ............ 708/492 |
| 6,044,389 | A | | 3/2000 | Weng et al. |
| 6,687,725 | B1 | | 2/2004 | Chen et al. |
| 6,721,771 | B1 | | 4/2004 | Chang |
| 7,039,880 | B2 | | 5/2006 | Kan |
| 7,334,012 | B2 | | 2/2008 | Laurent |
| 2002/0116677 | A1 | * | 8/2002 | Morelos-Zaragoza ....... 714/781 |

OTHER PUBLICATIONS

"Galois Field Arithmetic Library," http://www.partow.net/projects/galois/index.html, 4 pages.
"Ring (mathematics)," http://en.wikipedia.org/wiki/Ring_(mathematics), 6 pages.
"Division(digital)," http://en.wikipedia.org/wiki/Division_(digital), 5 pages.
"Euclidean Algorithm," http://en.wikipedia.org/wiki/Euclidean_algorithm, 7 pages.
"Extended Euclidean Algorithm," http://en.wikipedia.org/wiki/Extended_Euclidean_algorithm, 8 pages.
"Finite Field Arithmetic," http://en.wikipedia.org/wiki/Finite_field_arithmetic, 5 pages.
"Finite Field," http://en.wikipedia.org/wiki/Finite_field, 9 pages.
Jeannerod et al., "High-Radix Floating-Point Division Algorithms for Embedded VLIW Integer Processors," Extended Abstract, 4 pages.

* cited by examiner

*Primary Examiner* — Tan V. Mai
(74) *Attorney, Agent, or Firm* — Trop, Pruner & Hu, P.C.

(57) ABSTRACT

Methods, apparatus and media for performing polynomial arithmetic operations over a Galois field having characteristic 2 and size 1 are disclosed. Such methods, apparatus and media include generating a binary representation of a polynomial over a Galois field having characteristic 2 and size 1, generating a plurality of right shifted binary representations of the first polynomial, and generating a binary representation of the polynomial reciprocal based upon a bitwise exclusive-OR of the binary representation of the polynomial and one or more right shifted binary representations selected from the plurality of right shifted binary representations.

20 Claims, 4 Drawing Sheets

METHOD, APPARATUS AND MEDIA FOR PERFORMING GF(2) POLYNOMIAL OPERATIONS

BACKGROUND

In abstract algebra, a finite field or Galois field is a field that contains a finite number of elements. Arithmetic in a finite field is different from standard integer arithmetic. There are a limited number of elements in the finite field and all operations performed in the finite field result in an element within that field.

While each finite field is itself not infinite, there are infinitely many different finite fields. The number of elements also called cardinality in a finite field is of the form p where p is a prime number and n is a positive integer. Furthermore, two fields of the same size are isomorphic. The prime p is called the characteristic of the field, and the positive integer n is called the dimension or size of the field.

The Galois Field having characteristic 2 and size 1 is commonly denoted as GF(2). Polynomials over the GF(2) field have coefficients which are elements of the GF(2) field. Moreover, arithmetic over the GF(2) field and polynomial arithmetic over the GF(2) field are the basis for many computer applications. For example, polynomial arithmetic over the GF(2) field is used to produce error correcting codes such as, for example, BCH error-correcting codes and Reed Solomon error correcting codes. Polynomial arithmetic over the GF(2) field is also used in digital signal processing applications such as in determining an Infinite Impulse Response (IIR). Furthermore, polynomial arithmetic over the GF(2) field is used in cryptography algorithms such as the Advanced Encryption Standard (AES) block cipher. Thus, efficient polynomial arithmetic over the GF(2) field may have a positive effect on performance of a computing device that utilizes such error correcting codes and/or cryptographic algorithms.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
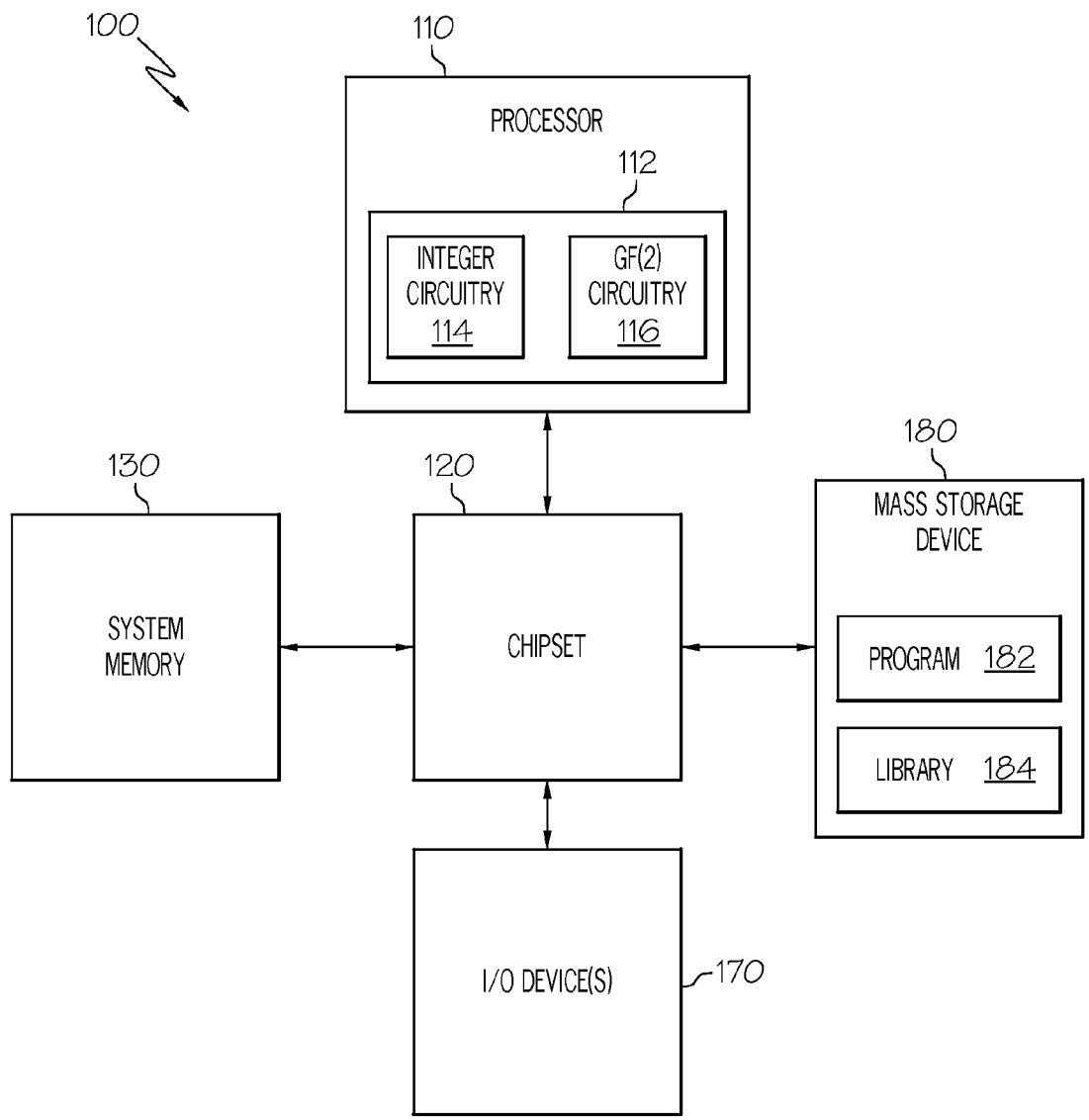
FIG. 1 shows an embodiment of a computing device suitable for performing GF(2) arithmetic operations.

FIG. 1 shows an embodiment of a computing device 100 to perform polynomial arithmetic over the Galois field having characteristic 2 and size 1. As shown, the computing device 100 may include a processor 110, a chipset 120, and system memory 130. The computing device 100 may further include I/O devices 170 and a mass storage device 180.

The processor 110 may comprise one or more processors from Intel Corp. or another processor manufacture such as IBM Corp. and AMD Inc. The processor 110 may further include arithmetic circuitry 112 to perform arithmetic operations. In particular, the arithmetic circuitry 112 may include integer arithmetic circuitry 114 as well as GF(2) arithmetic circuitry 116 to efficiently perform arithmetic and polynomial arithmetic over the Galois Field of characteristic 2 and size 1. The processor 110 may include one or more special purpose instructions which result in the GF(2) arithmetic circuitry 116 performing the requested polynomial arithmetic over the GF(2) field. For example, the processor 110 may include support for a polynomial division instruction which results in the GF(2) arithmetic circuitry 116 dividing a polynomial by another polynomial over the GF(2) field. The processor 110 may also include support for a GF(2) polynomial reciprocal instruction which results in the GF(2) arithmetic circuitry 116 computing and/or estimating the reciprocal of a polynomial over the GF(2) field. The processor 110 may also include a polynomial GF(2) multiply instruction with results in the GF(2) arithmetic circuitry 116 computing the polynomial product of two polynomials over the GF(2) field. Moreover, the processor 110 may include a polynomial GF(2) divide instruction which results in the GF(2) arithmetic circuitry 116 computing the polynomial quotient of two GF(2) polynomials.

The chipset 120 may include controllers to control components of the computing device 100. For example, the chipset 120 may include a memory controller to provide an interface between the processor 110 and the system memory 130. In some embodiments, the memory controller may be integrated into the processor 110 instead of the chipset 120. The chipset 120 may also include one or more mass storage device interface controllers such as, for example, a Parallel AT Attachment (ATA) interface controller, a Serial ATA interface controller, and/or Small Computer System Interface (SCSI) controller IDE to interface the mass storage device 180. The chipset 120 may also include a graphics controller, Universal Serial Bus (USB) controller, Peripheral Component Interconnection (PCI) Express controllers, audio controllers, keyboard controllers and the like in order to controller corresponding I/O devices 170 and other components of the computing device 100. The chipset 120 may also provide other platform supporting hardware such as one or more Direct Memory Access (DMA) controllers, an interrupt controller, and a real time clock.

The system memory 130 may store data and instructions to be processed and executed by the processor 110. The system memory 130 may comprise various types of volatile and/or non-volatile memory. For example, system memory 130 may include volatile memory such as Synchronous Dynamic Random Access Memory (SDRAM) devices, Dynamic Random Access Memory (DRAM) devices, RAMBUS Dynamic Random Access Memory (RDRAM) devices, and/or other volatile memory devices. Further, the system memory 130 may include non-volatile memory devices such as, for example, flash memory devices, read only memory (ROM) devices, Electrical Erasable Programmable ROM (EEPROM) devices, battery backed RAM devices, and/or other non-volatile memory devices.

The mass storage device 180 may include floppy disk drives, hard drive disks, compact disk drives, and digital versatile disk (DVD) drives to store data and/or instructions. In one embodiment, the mass storage device 180 includes a program 182 which utilizes the GF(2) instructions of the processor 110 in order to cause the GF(2) arithmetic circuitry 116 to perform the requested GF(2) operations. The mass storage device 180 may further include a GF(2) arithmetic library 184 and a program 186 that calls GF(2) functions of the library 184 in order to cause the processor 110 to perform the requested GF(2) operations. In particular, the library 184 may define GF(2) functions based upon standard integer operations supported by the integer arithmetic circuitry 114 of the processor 110 such as, for example, logical shift operations, exclusive-OR (XOR) operations, negation operations, and bit test operations. In this manner, the library 184 enables the processor 110 to perform to perform the GF(2) operations defined by functions of the library 184 without utilizing the GF(2) arithmetic circuitry 116 albeit at a likely reduced performance. Such a library 184 is especially useful for processors that do not include the GF(2) arithmetic circuitry 116.

Moreover, a program may be coded such that program utilizes the GF(2) arithmetic circuitry 116 if present and utilizes the integer arithmetic circuitry 114 via the GF(2) arithmetic library 184 if the GF(2) arithmetic circuitry 116 is not present. In this manner, a single program may be maintained instead of requiring a separate version for processors with GF(2) arithmetic support and a separate version for processors without GF(2) arithmetic support. In one embodiment, the GF(2) arithmetic library 184 may include the tests for GF(2) arithmetic circuitry 116 so that a programmer may code without regard to processor support and simply use the GF(2) arithmetic library 184. Thus, a programmer may rely upon the GF(2) arithmetic library 184 to decide at runtime whether to utilize GF(2) arithmetic circuitry 116 or integer arithmetic circuitry 114.

Figure 2:
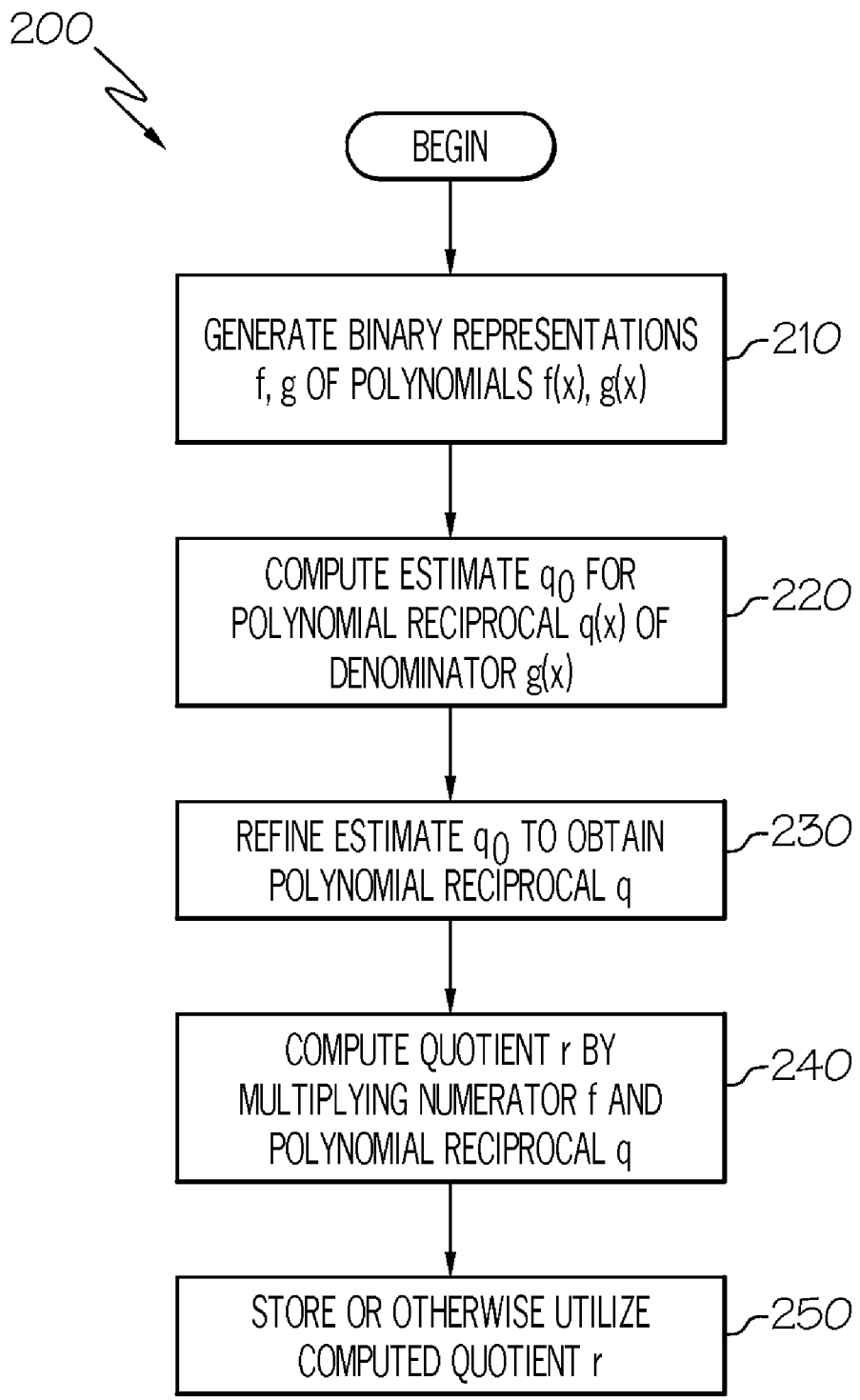
FIG. 2 shows an embodiment of method for performing a GF(2) polynomial division.

Referring now to FIG. 2, an embodiment of a method 200 is shown which may be used by the GF(2) arithmetic circuitry 116 and/or the GF(2) arithmetic library 184 of the computing device 100 to divide a first polynomial f(x) by a second polynomial g(x) to obtain a polynomial quotient r(x). As shown, the computing device 100 at block 210 may generate a binary representation f of the first polynomial f(x) and a binary representation g of the second polynomial g(x). In one embodiment, the polynomials f(x) and g(x) are represented by binary numbers f, g, with each term in the respective polynomial f(x), g(x) represented by one bit in the corresponding element's binary expression. Moreover, the present disclosure uses the common practice of enclosing such binary number representations of GF(2) field polynomials in braces, "{" and "}", to indicate that the value is an element of the GF(2) field. For example, the following are equivalent representations of the same value in a Galois field having characteristic 2 and size 1:

Polynomial: $x^6+x^4+x+1$, or
$0 \times x^7+1 \times x^6+0 \times x^5+1 \times x^4+0 \times x^3+0 \times x^2+1 \times x^1+1 \times x^0$
Binary: {0101 0011}
Hexadecimal: {53}

At block 220, the computing device 100 may compute an estimate $q_0$ for a polynomial reciprocal q(x) of the denominator g(x). Details of one embodiment of a method 300 which the computing device 100 may utilize to compute the representation $q_0$ of the polynomial reciprocal q(x) are discussed below in regard to FIG. 3. At block 230, the computing device 100 may iteratively refine the binary representation $q_0$ to obtain a representation q of the polynomial reciprocal q(x) that is exact to a fixed precision bit accuracy or has sufficient bit accuracy for the application at hand. In one embodiment, the computing device 100 uses the iterative Netwon Raphson method to converge the binary representation $q_0$ toward a binary representation q of the polynomial reciprocal q(x). However, other methods of bettering the bit accuracy of binary representation $q_0$ of the polynomial reciprocal q(x) may also be used.

At block 240, the computing device 100 may compute the polynomial quotient r(x) of the polynomials f(x), g(x). In particular, the computing device 100 may compute the GF(2) product of the polynomial representation f and the polynomial reciprocal representation q. Since the representation q corresponds to the reciprocal of the polynomial g(x), the resulting polynomial product corresponds to a polynomial quotient r(x) of the polynomial f(x) divided by the polynomial g(x). In one embodiment, the computing device 100 utilizes the GF(2) arithmetic circuitry 116 to perform the above multiplication of the representations and q to obtain the binary representation r of the polynomial r(x). However, the computing device 100 may alternatively utilizes the GF(2) arithmetic library 184 to perform a GF(2) multiplication off and q using the integer arithmetic circuitry 114.

At block 250, the computing device 100 may output and/or otherwise use the resulting quotient r(x) of the polynomial f(x) divided by the polynomial g(x) over the Galois field having characteristic 2 and size 1. For example, the computing device 100 may store the resulting quotient r to a location of system memory 130, mass storage device 180, a register of the processor 110, or some other storage location. The computing device 100 may generate a signal representative of the obtained quotient r which may be used by other circuitry of the computing device 100 as a basis for other operations. For example, the computing device 100 may include cryptographic circuitry (not shown) that receives the binary representation r and performs cryptographic functions based upon the binary representation r of the polynomial r(x).

Figure 3:
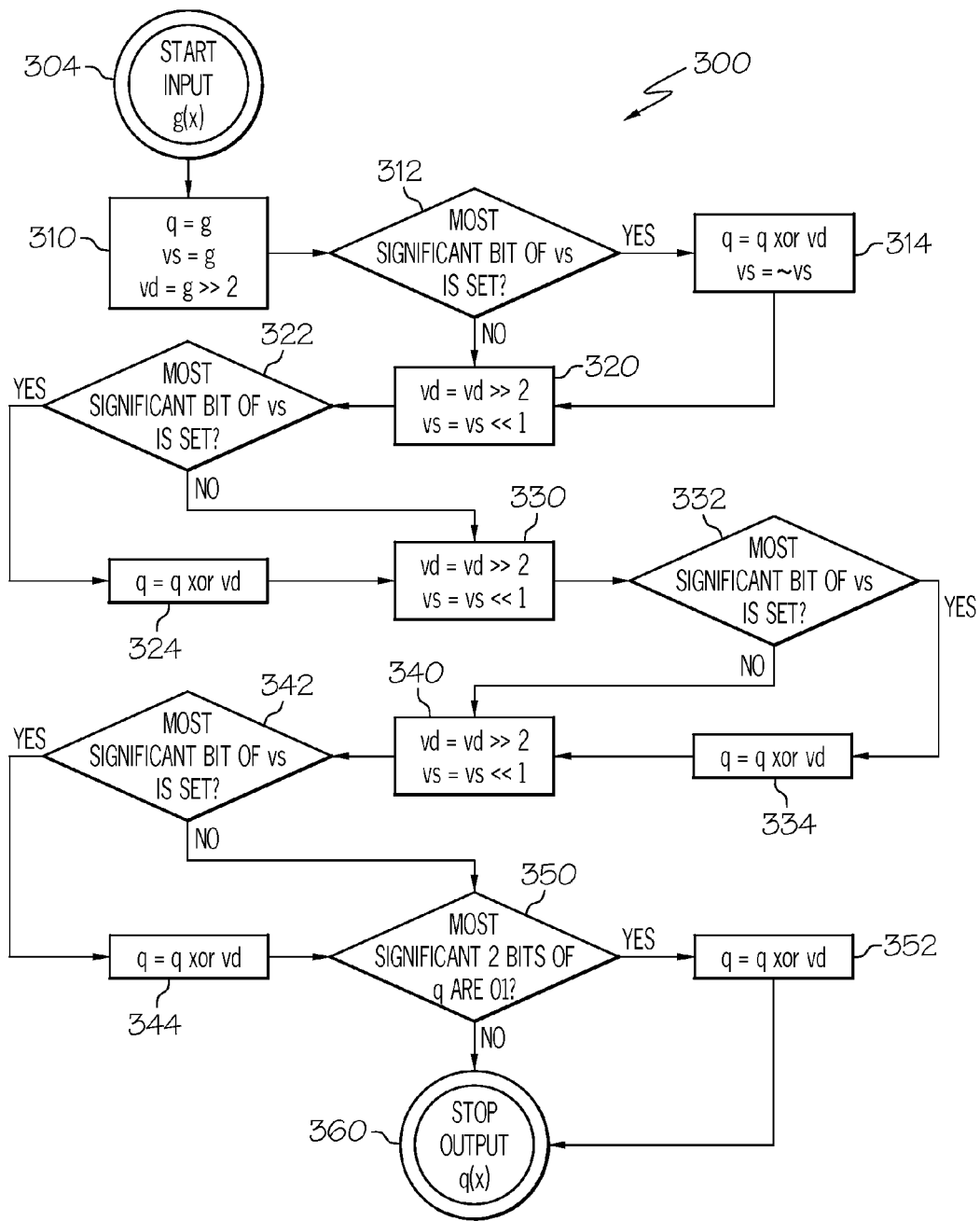
FIG. 3 shows an embodiment of a method for computing a polynomial reciprocal of a GF(2) polynomial.

Referring now to the FIG. 3, an embodiment of a polynomial reciprocal method 300 for computing a polynomial reciprocal representation q of a polynomial g(x) is shown in the form of an illustrative flowchart. The flowchart of FIG. 3 includes shift right operations (>>) to shift bits of operands in the direction of the least significant bit and shift left operations (<<) to shift bits of operands in the direction of the most significant bit. Such shift operations may be performed in hardware and/or software without in fact shifting such bit values within a shift register or other storage location. Instead, hardware interconnect lines may simply connect the relevant bits of the operand to the logic gates performing the operation. Similarly, a complier may optimize one or more of the shift operations away using bit masks and/or pre-computed values. At any rate, while such implementations may not perform register shift operations, such implementations may still be viewed as operating upon shifted representations of such operands.

At block 304, the computing device 100 may receive as input a binary representation g of a GF(2) polynomial g(x). For example, the computing device 100 may receive a binary representation g of {7} for a GF(2) polynomial of $x^2+x+1$.

At block 310, the computing device 100 may initialize a binary representation $q_0$ which is an estimated of the polynomial reciprocal q(x) of the input polynomial g(x). The computing device 100 may further initialize a control word vs and a shifted representation vd of the divisor g(x). In one embodiment, the computing device 100 may convert the representation g of the polynomial g(x) to a fixed precision of n bit accuracy by left shifting the binary representation g until bit n+1 is set. For example, if g is {7}, then the computing device 100 may convert the binary representation g of the polynomial g(x) to a fixed precision of 16 bit accuracy by left shifting the binary representation g until bit 17 is set. This conversion to fixed precision may be represented in the C programming language as g=(0x7<<14) which results in a 16 bit value of {c000} for the binary representation g. Moreover, the computing device 100 in response to a polynomial input g of {7} may set the control word vs to {c000} which is the fixed precision representation of g(x) and the shifted representation vd of the divisor polynomial g(x) to a fixed precision value of {7000} which is a right shifted representation of the input polynomial g(x) in fixed precision of 16 bits. After block 310, the binary representation $q_0$ of the polynomial reciprocal q(x) is at least one bit accurate.

At block 312, the computing device 100 may determine whether the most significant bit of the control word vs is set. In the C programming language, the most significant bit of a fixed precision 16 bit accurate value may be determined using the following function which performs a bitwise AND of the control word vs and an appropriate mask value:

$msb(x)$return$((x\&0x8000)!=0)$

However, it should be appreciated that the most significant bit may be tested using other functions and/or techniques. For example, a hardware implementation may simply directly examine the most significant bit to determine whether the most significant bit is set without performing a bitwise AND of the control word vs and appropriate mask value.

If not set, then the computing device 100 may continue to block 320. However, if the most significant bit of the control word vs is set, then the computing device 100 at block 314 may subtract the shifted representation vd of the polynomial divisor g(x) from the estimated polynomial reciprocal representation $q_0$. If set, the computing device 100 may further perform a bitwise negation of the control word vs. Addition and subtraction of two GF(2) elements over the GF(2) field is the same as a bitwise XOR of the two GF(2) elements. Accordingly, the computing device 100 in one embodiment may perform a bitwise XOR of the binary representation $q_0$ of the polynomial reciprocal q(x) and the shifted representation vd of the polynomial divisor g(x) to subtract the shifted polynomial divisor vd from the polynomial reciprocal representation $q_0$ and obtain an updated or revised binary representation $q_0$ of the polynomial reciprocal q(x).

Continuing the above example where the polynomial reciprocal method 300 received a binary representation g of {7} as input, the computing device 100 at block 312 may determine that the most significant bit of the control word vs is set. The computing device 100 may in turn reduce the binary representation $q_0$ of the polynomial reciprocal by the shifted representation vd of the polynomial divisor g(x) by performing a bitwise XOR of the estimated polynomial representation $q_0$ of {c000} and the shifted representation vd {7000} of the polynomial divisor g(x) to obtain the revised representation $q_0$ of the polynomial reciprocal. The computing device 100 may further perform a bitwise negation of the control word vs of 0xc000 to obtain the updated control word vs of 0x3fff. After block 314, the binary representation $q_0$ of the polynomial reciprocal q(x) is at least three bit accurate.

At block 320, the computing device 100 may update the representation vd to a new right shifted representation of the input polynomial g(x) and may update the control word vs for the next revision of the reciprocal representation $q_0$. In particular, the computing device 100 may left shift the control word vs by 1 bit and may right shift the shifted representation vd of the polynomial divisor g(x) by 2 bits. Continuing the above example, the computing device 100 at block 320 may set the shifted representation vd of the polynomial divisor g(x) to a further right shifted representation of the polynomial divisor g(x). In particular, the computing device 100 at block 320 may set the shifted representation vd of the polynomial divisor g(x) to {1c00} which is the prior shifted representation right shifted by 2 bits or the fixed precision input polynomial g right shifted by 4 bits. Similarly, the computing device 100 at block 320 may set the control word vs to 0x7ffe which is the prior control word left shifted by 1 bit. It should be appreciated that the control word vs is also equal to either the fixed precision input polynomial g left shifted by 1 bit or the negation of the fixed precision input polynomial g left shifted by 1 bit.

At block 322, the computing device 100 may determine whether the most significant bit of the control word vs is set in the manner explained above. If not set, then the computing device 100 may continue to block 330. However, if the most significant bit of the control word vs is set, then the computing device 100 at block 324 may subtract the shifted representation vd of the divisor polynomial g(x) from the estimated polynomial reciprocal representation $q_0$. The computing device 100 in one embodiment may perform a bitwise XOR of the binary representation $q_0$ of the polynomial reciprocal q(x) and the shifted representation vd of the divisor polynomial g(x) to subtract the shifted divisor polynomial from the polynomial reciprocal representation $q_0$ and obtain an updated or revised binary representation $q_0$ of the polynomial reciprocal q(x).

Continuing the above example where the polynomial reciprocal method 300 received a binary representation g of {7} as input, the computing device 100 at block 322 may determine that the most significant bit of the control word vs (0x3fff) is not set and continue to block 330, thus retaining the binary representation $q_0$ of the polynomial reciprocal at {b000}, the shifted representation vd at {1c00}, and the control word vs at 0x3fff.

At block 330, the computing device 100 may update the shifted representation vd to a new right shifted representation of the input polynomial g(x) and may update the control word vs for the next revision of the reciprocal representation $q_0$. In particular, the computing device 100 may left shift the control word vs by 1 bit and may right shift the shifted representation vd of the polynomial divisor g(x) by another 2 bits. Continuing the above example, the computing device 100 at block 330 may set the shifted representation vd of the polynomial divisor g(x) to a further right shifted representation of the input polynomial g(x). In particular, the computing device 100 may set the shifted representation vd of the polynomial divisor g(x) to {0700} which is the prior shifted representation further right shifted by 2 bits or the fixed precision input polynomial g right shifted by 6 bits. Similarly, the computing device 100 at block 330 may set the control word vs to 0xfffc which is the prior control word vs left shifted by 1 bit. It should be appreciated that the control word vs is also equal to either the fixed precision input polynomial g left shifted by 2 bits or the negation of the fixed precision input polynomial g left shifted by 2 bits.

At block 332, the computing device 100 may determine whether the most significant bit of the control word vs is set in the manner explained above. If not set, then the computing device 100 may continue to block 340. However, if the most significant bit of the control word vs is set, then the computing device 100 at block 334 may subtract the shifted representation vd of the polynomial divisor g(x) from the estimated polynomial reciprocal representation $q_0$. The computing device 100 in one embodiment may perform a bitwise XOR of the binary representation q0 of the polynomial reciprocal q(x) and the shifted representation vd of the polynomial divisor g(x) to subtract the shifted polynomial divisor from the polynomial reciprocal representation $q_0$ and obtain an updated or revised binary representation $q_0$ of the polynomial reciprocal q(x).

Continuing the above example where the polynomial reciprocal method 300 received a binary representation g of {7} as input, the computing device 100 at block 332 may determine that the most significant bit of the control word vs (0xfffc) is set. The computing device 100 may in turn reduce the binary representation $q_o$ of the polynomial reciprocal by the shifted representation vd of the input polynomial g(x) by performing a bitwise XOR of the estimated polynomial representation $q_o$ of {b000} and the shifted representation vd {0700} of the polynomial divisor g(x) to obtain the revised representation $q_o$ of the polynomial reciprocal of {b700}. After block 334, the binary representation $q_o$ of the polynomial reciprocal q(x) is at least five bit accurate, the shifted representation vd is at {0700} and the control word vs is at 0xfffc.

At block 340, the computing device 100 may update the representation vd to a new right shifted representation of the input polynomial g(x) and may update the control word vs for the next revision of the reciprocal representation $q_0$. In particular, the computing device 100 may left shift the control word vs by 1 bit and may right shift the shifted representation vd of the polynomial divisor g(x) by another 2 bits. Continuing the above example, the computing device 100 at block 340 may set the shifted representation vd of the polynomial divisor g(x) to a further right shifted representation of the input polynomial g(x). In particular, the computing device 100 may set the shifted representation vd to {01c0} which is the prior shifted representation further right shifted by 2 bits or the fixed precision input polynomial g right shifted by 8 bits. Similarly, the computing device 100 at block 340 may set the control word vs to 0xfff8 which is the prior control word vs left shifted by 1 bit. It should be appreciated that the control word vs is also equal to either the fixed precision input polynomial g left shifted by 3 bits or the negation of the fixed precision input polynomial g left shifted by 3 bits.

At block 342, the computing device 100 may determine whether the most significant bit of the control word vs is set in the manner explained above. If not set, then the computing device 100 may continue to block 350. However, if the most significant bit of the control word vs is set, then the computing device 100 at block 344 may subtract the shifted representation vd of the polynomial divisor g(x) from the estimated polynomial reciprocal representation $q_0$. The computing device 100 in one embodiment may perform a bitwise XOR of the binary representation $q_0$ of the polynomial reciprocal q(x) and the shifted representation vd of the polynomial divisor g(x) to subtract the shifted polynomial divisor from the polynomial reciprocal representation $q_0$ and obtain an updated or revised binary representation $q_0$ of the polynomial reciprocal q(x).

Continuing the above example where the polynomial reciprocal method 300 received a binary representation g of {7} as input, the computing device 100 at block 342 may determine that the most significant bit of the control word vs (0xfff8) is set. The computing device 100 may in turn reduce the binary representation $q_0$ of the polynomial reciprocal by the shifted representation vd by performing a bitwise XOR of the estimated polynomial representation $q_0$ of {b700} and the shifted representation vd {01c0} of the input polynomial g(x) to obtain the revised representation $q_0$ of the polynomial reciprocal of {b6c0}. After block 344, the binary representation $q_0$ of the polynomial reciprocal q(x) is {b6c0}, the shifted representation vd is at {01c0] and the control word vs is at 0xfff8.

At block 350, the computing device 100 determines whether a correction of the representation $q_0$ is warranted. In particular, the computing device 100 determines to correct or revise the polynomial reciprocal representation $q_0$ if the most two significant bits of the polynomial reciprocal representation $q_0$ are respectively "0" and "1". If the most significant bit is a "0" and the second most significant bit is a "1", then the computing device 100 proceeds to block 352 to correct the reciprocal representation $q_0$. Otherwise, the computing device 100 proceeds to block 360 to output the computed estimated $q_0$ for the polynomial reciprocal q(x) of the input polynomial g(x).

In one embodiment, the GF(2) circuitry 116 determines whether to correct or revise the polynomial reciprocal based upon the three most significant bits of the input polynomial g(x). In one embodiment, the most significant bit $a_0$ of the input polynomial representation g is always "1" as a result of the fixed precision representation of the input polynomial g(x). As a result, the intermediate representation $q_0$ at block 350 has a most significant bit of a "0" and a second most significant bit of "1" if second most significant bit a1 and the third most significant bit a2 of the input polynomial g(x) satisfy the following test (1):

$$((a_1==0) \text{ and } ((a_2 \char`\^ a_1)==1))==1$$

where $a_1$ corresponds to (g & 0x8000) and $a_2$ corresponds to (g & 0x4000) in fixed precision of 16 bit accuracy. Accordingly, in one embodiment, the computing device 110 at block 350 may determine whether the intermediate representation $q_0$ has the above proprieties based upon the three most significant bits of the input polynomial representation g. As such, the GF(2) circuitry 116 may include circuitry that determines whether to correct the intermediate representation $q_0$ in parallel with computing the intermediate representation $q_0$ since the above test (1) does not depend upon the computed intermediate representation $q_0$ but upon the input polynomial representation g.

At block 352, the computing device 100 corrects the binary representation $q_0$ by further reducing the binary representation $q_0$ by the shifted representation vd of the polynomial divisor g(x). In particular, the computing device 100 at block 352 may subtract the shifted representation vd from the estimated polynomial reciprocal representation $q_0$. The computing device 100 in one embodiment may perform a bitwise XOR of the binary representation $q_0$ of the polynomial reciprocal q(x) and the shifted representation vd of the polynomial divisor g(x) to subtract the shifted polynomial divisor from the polynomial reciprocal representation $q_0$ and obtain an updated or revised binary representation $q_0$ of the polynomial reciprocal q(x).

Continuing the above example where the polynomial reciprocal method 300 received a binary representation g of {7} as input, the computing device 100 at block 350 may determine that the most significant bit and the second most significant bit of the control word vs (0xfff8) are not respectively 0 and 1 but instead are both set. Accordingly, the computing device 100 proceeds to block 360 to output the value 0xb6c0 for the estimated binary representation $q_0$ of the polynomial reciprocal q(x). By block 360, the binary representation $q_0$ is at least 9 bit accurate.

Figure 4:
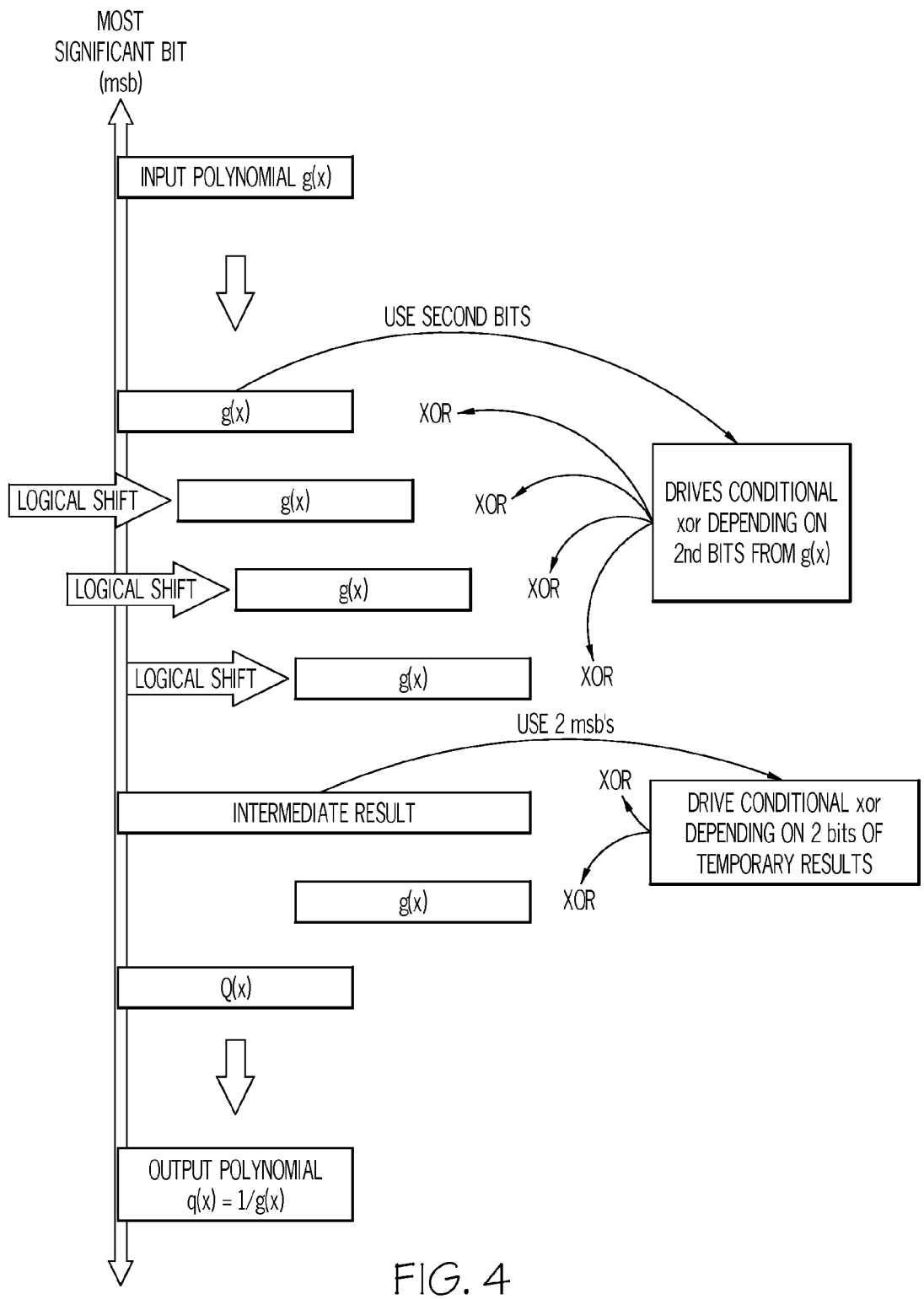
FIG. 4 shows an embodiment of a parallelized form of the polynomial reciprocal method of FIG. 3.

While FIG. 3 depicts the above polynomial reciprocal method 300 as a sequential procedure, it should be appreciated that the polynomial reciprocal method 300 is easily parallelized. Such a parallel implementation is better understood from FIG. 4. As shown the polynomial reciprocal method 300 may be viewed as performing a conditional bitwise XOR of a plurality of right shifted versions of the input polynomial g(x). In particular, bits of the input polynomial g(x) are used to select right shifted versions of the input polynomial g(x) and to include such selected polynomials in the bitwise XOR operation. Thus, the right shifted versions of the polynomial g(x) depicted in FIG. 4 correspond to the various shifted representations vd of the method 300 and the selection of right shifted polynomials based upon set bits of the input polynomial g(x) corresponds to the control word vs of the above method 300.

The above polynomial reciprocal method 300 was described in relation to the polynomial division method 200. However, the estimated reciprocal $q_0$ obtained using the polynomial reciprocal method 300 may be useful in other operations as well. For example, the estimated reciprocal $q_0$ may be used by in an Extended Euclidian Algorithm to find the multiplicative inverse of a polynomial over the GF(2) field.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

What is claimed is:

1. A method, comprising
generating a binary representation of a first polynomial over a GF(2) field, in an arithmetic circuit of a processor,
generating a plurality of right shifted binary representations of the first polynomial, in the arithmetic circuit,
generating a binary representation of a reciprocal of the first polynomial based upon a bitwise exclusive-OR of the binary representation of the first polynomial and one or more right shifted binary representations selected from the plurality of right shifted binary representations, in the arithmetic circuit, and
storing the binary representation of the first polynomial reciprocal to a storage location.

2. The method of claim 1, further comprising multiplying a binary representation of a second polynomial over the GF(2) field by the binary representation of the first polynomial reciprocal to obtain a binary representation of a quotient corresponding to the second polynomial divided by the first polynomial.

3. The method of claim 1, further comprising converting the binary representation of the first polynomial to fixed precision with a predetermined number of bit accuracy prior to generating the plurality of right shifted binary representations and the binary representation of the first polynomial reciprocal.

4. The method of claim 1, further comprising selecting the one or more right shifted binary representations to be combined with the binary representation of the first polynomial based upon whether a corresponding bit of the binary representation of the first polynomial is set.

5. The method of claim 1, further comprising
setting a control word equal to the binary representation of the first polynomial,
performing a bitwise negation of the control word in response to determining that a most significant bit of the control word is set, and
selecting the one or more right shifted binary representations to be combined with the binary representation of the first polynomial based upon whether a corresponding bit of the control word is set.

6. The method of claim 1, wherein generating the plurality of right shifted binary representations of the first polynomial, comprises
generating a first right shifted binary representation which corresponds to the binary representation of the first polynomial right shifted by 2 bits,
generating a second right shifted binary representation which corresponds to the binary representation of the first polynomial right shifted by 4 bits,
generating a third right shifted binary representation which corresponds to the binary representation of the first polynomial right shifted by 6 bits, and
generating a fourth right shifted binary representation which corresponds to the binary representation of the first polynomial right shifted by 8 bits.

7. The method of claim 6, further comprising
setting a control word equal to the binary representation of the first polynomial,
in response to determining that a most significant bit of the control word is set, performing a bitwise negation of the control word, and selecting the first right shifted binary representation for the bitwise exclusive-OR,
selecting the second right shifted binary representation for the bitwise exclusive-OR in response to determining that a second most significant bit of the control word is set,
selecting the third right shifted binary representation for the bitwise exclusive-OR in response to determining that a third most significant bit of the control word is set, and
selecting the fourth right shifted binary representation for the bitwise exclusive-OR in response to determining that a fourth most significant bit of the control word is set.

8. The method of claim 6, wherein generating the binary representation of the first polynomial reciprocal comprises
performing a bitwise exclusive-OR of the binary representation of the first polynomial and one or more right shifted binary representations selected from the plurality of right shifted binary representations to obtain an intermediate representation of the first polynomial reciprocal, and
if a most significant bit of the intermediate representation is set and a second most significant bit of the intermediate representation is clear, then performing a bitwise exclusive-OR of the intermediate representation of the first polynomial reciprocal and a right shifted binary representation of the first polynomial which corresponds to the binary representation of the first polynomial shifted to the right by 2 bits.

9. The method of claim 1, wherein generating the binary representation of the first polynomial reciprocal comprises
performing a bitwise exclusive-OR of the binary representation of the first polynomial and one or more right shifted binary representations selected from the plurality of right shifted binary representations to obtain an intermediate representation of the first polynomial reciprocal, and
using the intermediate representation of the first polynomial reciprocal in an iterative method that converges the intermediate representation to the binary representation of the first polynomial reciprocal.

10. A non-transitory machine readable storage medium, comprising a plurality of instructions that, in response to being executed, results in a computing device
generating a plurality of right shifted binary representations of a first polynomial over a GF(2) field having characteristic 2 and size 1, generating a binary representation of a reciprocal of the first polynomial based upon a bitwise exclusive-OR of the binary representation of the first polynomial and one or more right shifted binary representations selected from the plurality of right shifted binary representations, and multiplying a binary representation of a second polynomial over the GF(2) field by the binary representation of the first polynomial reciprocal to obtain a binary representation of a quotient corresponding to the second polynomial divided by the first polynomial.

11. The machine readable medium of claim 10, wherein the plurality of instructions further result in the computing device generating the binary representation of the first polynomial reciprocal by performing a bitwise exclusive-OR of the binary representation of the first polynomial and one or more right shifted binary representations selected from the plurality of right shifted binary representations to obtain an intermediate representation of the first polynomial reciprocal, and using an Netwon-Raphson algorithm to converge the intermediate representation of the first polynomial reciprocal to the binary representation of the first polynomial reciprocal.

12. The machine readable medium of claim 10, wherein the plurality of instructions further result in the computing device converting the binary representation of the first polynomial to fixed precision with a predetermined bit accuracy prior to generating the plurality of right shifted binary representations and the binary representation of the first polynomial reciprocal, and restoring a most significant bit of the binary representation of the first polynomial reciprocal to maintain the predetermined number bit accuracy.

13. The machine readable medium of claim 10, wherein the plurality of instructions further result in the computing device selecting the one or more right shifted binary representations to be combined with the binary representation of the first polynomial based upon whether a corresponding bit of the binary representation of the first polynomial is set.

14. The machine readable medium of claim 10, wherein the plurality of instructions further result in the computing device generating a first right shifted binary representation of the plurality of right shifted binary representations which corresponds to the binary representation of the first polynomial right shifted by 2 bits, generating a second right shifted binary representation of the plurality of right shifted binary representations which corresponds to the binary representation of the first polynomial right shifted by 4 bits, generating a third right shifted binary representation of the plurality of right shifted binary representations which corresponds to the binary representation of the first polynomial right shifted by 6 bits, and generating a fourth right shifted binary representation of the plurality of right shifted binary representations which corresponds to the binary representation of the first polynomial right shifted by 8 bits.

15. The machine readable medium of claim 14, wherein the plurality of instructions further result in the computing device setting a control word equal to the binary representation of the first polynomial, in response to determining that a most significant bit of the control word is set, performing a bitwise negation of the control word, and selecting the first right shifted binary representation for the bitwise exclusive-OR, selecting the second right shifted binary representation for the bitwise exclusive-OR in response to determining that a second most significant bit of the control word is set, selecting the third right shifted binary representation for the bitwise exclusive-OR in response to determining that a third most significant bit of the control word is set, and selecting the fourth right shifted binary representation for the bitwise exclusive-OR in response to determining that a fourth most significant bit of the control word is set.

16. A computing device, comprising a memory to store a plurality of instructions, and a processor to execute instructions of the plurality of instructions, the processor comprising integer arithmetic circuitry to perform integer arithmetic and field arithmetic circuitry to perform finite field arithmetic over a GF(2) field having characteristic 2 and size 1, the field arithmetic circuitry to generate a binary representation of a polynomial reciprocal based upon a bitwise exclusive-OR of a binary representation of a first polynomial and one or more right shifted binary representations selected from a plurality of right shifted binary representations, and multiply a binary representation of a second polynomial over the GF(2) field by the binary representation of the polynomial reciprocal to obtain a binary representation of a quotient corresponding to the second polynomial divided by the first polynomial.

17. The computing device of claim 16, wherein the field arithmetic circuitry is to perform a bitwise exclusive-OR of the binary representation of the first polynomial and one or more right shifted binary representations selected from the plurality of right shifted binary representations to obtain an intermediate representation of the polynomial reciprocal, and iteratively converge the intermediate representation of the polynomial reciprocal to the binary representation of the polynomial reciprocal.

18. The computing device of claim 16, wherein the field arithmetic circuitry is to convert the binary representation of the first polynomial to fixed precision with a predetermined bit accuracy prior to generating the plurality of right shifted binary representations and the binary representation of the polynomial reciprocal, and restore a most significant bit of the binary representation of the polynomial reciprocal to maintain the predetermined number bit accuracy.

19. The computing device of claim 16, wherein the field arithmetic circuitry is to select the one or more right shifted binary representations to be combined with the binary representation of the first polynomial based upon whether a corresponding bit of the binary representation of the first polynomial is set.

20. The computing device of claim 16, wherein the field arithmetic circuitry is to set a control word equal to the binary representation of the first polynomial, perform a bitwise negation of the control word and select a first right shifted binary representation that corresponds to the binary representation of the first polynomial right shifted by 2 bits if a most significant bit of the control word is set, select a second right shifted binary representation that corresponds to the binary representation of the first poly nomial right shifted by 4 bits if a second most significant bit of the control word is set,
select a third right shifted binary representation that corresponds to the binary representation of the first polynomial right shifted by 6 bits if a third most significant bit of the control word is set, and select a fourth right shifted binary representation that corresponds to the binary representation of the first polynomial right shifted by 8 bits if a fourth most significant bit of the control word is set.

\* \* \* \* \*